United States Patent [19]

Hasegawa

[11] Patent Number: 5,394,380
[45] Date of Patent: Feb. 28, 1995

[54] MAGNETO-OPTIC RECORDING APPARATUS AND METHOD THEREFOR

[75] Inventor: Koyo Hasegawa, Tokyo, Japan

[73] Assignee: Canon Kabushiki Kaisha, Tokyo, Japan

[21] Appl. No.: 79,371

[22] Filed: Jun. 21, 1993

[30] Foreign Application Priority Data

Jun. 23, 1992 [JP] Japan .................................. 4-187348
Jun. 10, 1993 [JP] Japan .................................. 5-163875

[51] Int. Cl.$^6$ ............................................. G11B 7/00
[52] U.S. Cl. ........................................ 369/13; 360/114
[58] Field of Search ..................... 369/13, 14; 360/114, 360/59, 46, 67, 68; 365/122

[56] References Cited

U.S. PATENT DOCUMENTS

| | | | |
|---|---|---|---|
| 4,712,203 | 12/1987 | Saito et al. ............... | 369/13 |
| 4,879,703 | 11/1989 | Kaku et al. ............... | 369/13 |
| 4,937,802 | 6/1990 | Omori et al. .............. | 369/13 |
| 5,043,960 | 8/1991 | Nakao et al. .............. | 369/13 |
| 5,121,369 | 6/1992 | Makansi ................... | 369/13 |
| 5,220,467 | 6/1993 | Zucker .................... | 369/13 |

FOREIGN PATENT DOCUMENTS

| | | |
|---|---|---|
| 0352099 | 1/1990 | European Pat. Off. . |
| 0447617 | 9/1991 | European Pat. Off. . |
| 3157839 | 7/1991 | Japan . |

OTHER PUBLICATIONS

Patent Abstracts of Japan, No. 61-059605, vol. 10, No. 223, Aug., 1986.
Patent Abstracts of Japan, No. 03-276404, vol. 10, No. 100, Mar., 1992.
Patent Abstracts of Japan, No. 03-189944, vol. 15, No. 451, Nov., 1991.

Primary Examiner—Robert J. Pascal
Assistant Examiner—Tan Dinh
Attorney, Agent, or Firm—Fitzpatrick, Cella, Harper & Scinto

[57] ABSTRACT

In a magneto-optic recording method and apparatus, an optical head irradiates a magneto-optic recording medium with a light beam, a magnetic head applies a modulated magnetic field to the recording medium to record a signal on the recording medium, a drive circuit supplies a drive signal to the magnetic head, a reference signal generating device causes the drive circuit to generate a reference signal having a predetermined duty, a reproducing device reproduces the signal recorded on the recording medium, a detection circuit detects a duty of a reproduced signal and a control circuit controls the drive signal such that the duty of the signal recorded on the basis of the reference signal and detected by the detection circuit becomes close to the predetermined duty.

11 Claims, 13 Drawing Sheets

FIG. 8
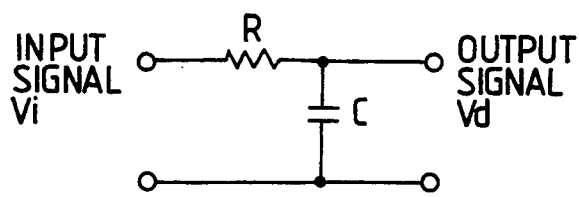
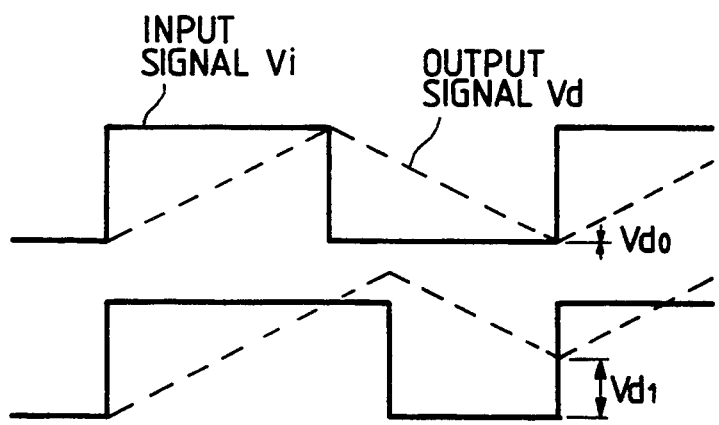
FIG. 9A
FIG. 9B
FIG. 10
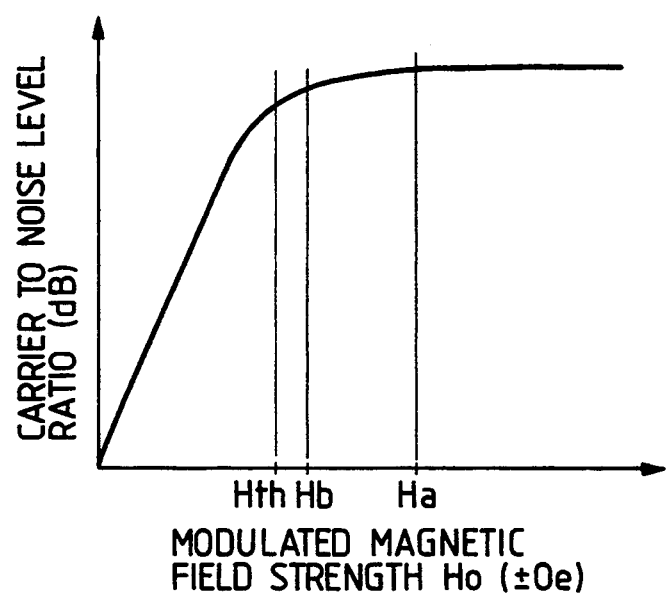

MAGNETO-OPTIC RECORDING APPARATUS AND METHOD THEREFOR

BACKGROUND OF THE INVENTION

1. Field of the Invention

The present invention relates to a magneto-optic recording apparatus of a magnetic modulation scheme and a method of recording information on a magneto-optic recording medium using this apparatus.

2. Related Background Art

FIG. 1 is a circuit diagram showing the arrangement of a general conventional magnetic head apparatus. Referring to FIG. 1, this apparatus comprises a magnetic head 1 and auxiliary coils $L_1$ and $L_2$. The magnetic head 1 is actually constituted by magnetic cores (not shown) and coils wound around the cores. Switching elements $T_1$ and $T_2$ must switch a current of 100 mA or more within a very short period of time. To satisfy this requirement, the switching elements $T_1$ and $T_2$ are optimally constituted by field effect transistors, respectively. In the following description, the field effect transistors $T_1$ and $T_2$ will be briefly referred to as transistors, respectively. Gate drive circuits 7 and 8 drive the gates of the transistors $T_1$ and $T_2$, respectively.

In the magnetic head drive apparatus described above, a digital information signal $S_1$ and its inverted information signal $S_2$ are input to the gate drive circuits 7 and 8, respectively. The gate drive circuits 7 and 8 generate gate drive voltages in correspondence with the information signals $S_1$ and $S_2$ of logic "1" to alternately turn on the transistors $T_1$ and $T_2$ in accordance with the information signals. The direction of current in the magnetic head 1 is switched in correspondence with logic "1" and logic "0" of the information signals, so that the magnetic head 1 generates magnetic field components having different polarities respectively corresponding to the current directions. More specifically, a magnetic field generated by the magnetic head 1 is modulated in accordance with the information signals, and the modulated magnetic field is applied to a magneto-optic recording medium (not shown). Magnetization patterns corresponding to the polarities of the applied magnetic field components are formed on the recording medium, thereby recording the information signals. The auxiliary coils $L_1$ and $L_2$ can always receive current regardless of the ON/OFF states of the transistors $T_1$ and $T_2$. The auxiliary coils $L_1$ and $L_2$ operate to reverse the current supplied to the magnetic head 1 at high speed.

FIGS. 2A to 2C are views showing a relationship between the modulated magnetic field components of the magnetic head and the magnetization patterns recorded by these modulated magnetic field components. FIGS. 2A to 2C exemplify recording of a single frequency signal with a 50% duty on the magneto-optic recording medium. FIG. 2A shows a magnetic field generated by the magnetic head. The absolute values of the positive and negative magnetic field strengths are $\pm H_0$ because the magnitudes of currents in the magnetic head in both directions are equal to each other. FIG. 2B shows a magnetization pattern obtained upon application of the modulated magnetic field to the magneto-optic recording medium. When the positive magnetic field is applied to the magneto-optic recording medium, an information pit having upward magnetization can be recorded. When the negative magnetic field is applied to the magneto-optic recording medium, an information pit having downward magnetization can be recorded. In FIG. 2B, a pit represented by + has upward magnetization, whereas a pit represented by − has downward magnetization. The magnetic head serving as an inductance element requires a certain switching time, e.g., about 25 ns. Assume that magnetic field components required for recording are defined as $\pm H_{th}$. When magnetic field components generated by the magnetic head reach $\pm H_{th}$, the magnetization pattern shown in FIG. 2B is recorded. FIG. 2C shows a reproduction signal obtained by reproducing this magnetization pattern. In this case, the lengths of upward magnetization and downward magnetization and the lengths of reproduction signals $T_{+1}$ and $T_{-1}$ are equal to each other because the magnetic field components from the magnetic head are directly applied to the recording medium.

In the conventional magneto-optic recording apparatus, however, leakage magnetic field components from magnetic field sources arranged near the magnetic head adversely affect the magnetic field components from the magnetic head, and the magnetic field components from the magnetic head are not always applied directly to the recording medium. The magnetic field sources are, for example, an actuator for driving an objective lens for focusing a light spot on the recording medium and a linear motor for accessing the optical head to a desired position on the recording medium. The leakage magnetic field components cannot be neglected because recent magneto-optic recording media have a higher sensitivity corresponding to a magnetic field sensitivity of 100 Gauss or less due to low power consumption and high-speed operation of the magnetic head. These leakage currents adversely affect the magnetic field components of the magnetic head.

If a leakage magnetic field of a linear motor or the like is defined as $+H_e$ and magnetic field components generated by a magnetic head are defined as $\pm H_0$, a magnetic field applied to the recording medium becomes a sum of the leakage magnetic field $+H_e$ and the modulated magnetic field components $\pm H_0$, as shown in FIG. 3A. Note that magnetic field components $\pm H_{th}$ are magnetic field components required for recording. The positive and negative magnetic field strengths on the recording medium are different from each other. When information is recorded under this condition, the length of upward magnetization of the magnetization pattern recorded on the recording medium is different from that of the downward magnetization thereof, as shown in FIG. 3B. That is, the magnetic field applied to the recording medium is shifted to the positive side due to the influence of the leakage magnetic field components, and the lengths of domains change accordingly. When the recorded information is reproduced, the pulse widths of the reproduction signal correspond to the lengths of the upward magnetization and the downward magnetization. A pulse width $T_{+2}$ of "1" is different from a pulse width $T_{-2}$ of "0", and a deviation from the duty of the original recording signal has occurred. This phenomenon depends on the magnitudes and directions of the leakage magnetic field components. The magnitude and direction of the duty vary depending on the positions of the leakage magnetic field sources such as the linear motor and the variations in leakage magnetic field components. When duty errors increase, recording error may occur.

SUMMARY OF THE INVENTION

It is an object of the present invention to provide a magneto-optic recording apparatus and a method therefor, capable of solving the conventional problems described above, preventing occurrence of recording errors, and accurately recording information.

In order to achieve the above object of the present invention, there is provided a magneto-optic recording apparatus comprising:

an optical head for irradiating a magneto-optic recording medium with a light beam;

a magnetic head for applying a modulated magnetic field to the recording medium to record a signal on the recording medium;

a drive circuit for supplying a drive signal to the magnetic head;

reproducing means for reproducing the signal recorded on the recording medium;

a detection circuit for detecting a duty of a reproduced signal; and a control circuit for controlling the drive signal in accordance with the duty detected by the detection circuit.

In order to achieve the above object according to the present invention, there is also provided a magnetic head drive apparatus comprising:

a magnetic head;

a pair of switching elements for switching current flowing through the magnetic head between first and second directions opposite to each other;

a gate drive circuit for driving the switching elements in accordance with a signal to be recorded;

a current detection device for detecting current values flowing in the first and second directions, respectively;

a setting circuit for setting first and second reference values in accordance with an external command signal;

a comparison circuit for comparing the current values of the first and second directions which are detected by the current detection device with the first and second reference values set by the setting circuit; and a control element for controlling operation to set the current values in the first and second directions to be equal to the first and second reference values, respectively, in accordance with a comparison result of the comparison circuit.

In order to achieve the above object according to the present invention, there is further provided a method of recording a signal using a magneto-optic recording apparatus comprising an optical head for irradiating a magneto-optic recording medium with a light beam, a magnetic head for applying a modulated magnetic field to the recording medium to record the signal on the recording medium, a drive circuit for supplying to the magnetic head a drive signal to the magnetic head, reproducing means for reproducing the signal recorded on the recording medium, and a detection circuit for detecting a duty of a reproduced signal, comprising the steps of:

supplying a reference signal having a predetermined duty to the magnetic head to record the reference signal on the recording medium;

causing the reproducing means to reproduce the reference signal recorded on the recording medium;

causing the detection circuit to detect the duty of a reproduced reference signal;

adjusting a current value of the reference signal so that the duty of a detected reference signal is set equal to the duty of the reference signal supplied to the recording head; and supplying to the magnetic head a drive signal modulated in accordance with information to be recorded and having a current value equal to that of an adjusted reference signal, thereby recording the information on the recording medium.

BRIEF DESCRIPTION OF THE DRAWINGS

FIG. 8 is a circuit diagram showing an arrangement of a reproduction signal duty detection circuit in the apparatus of FIG. 4;

FIGS. 9A and 9B are timing charts for explaining an operation of the reproduction signal duty detection circuit in FIG. 8;

FIG. 10 is a graph showing a relationship between a magnetic field strength and a carrier to noise level ratio (CN);

DETAILED DESCRIPTION OF THE PREFERRED EMBODIMENTS

Figure 4:
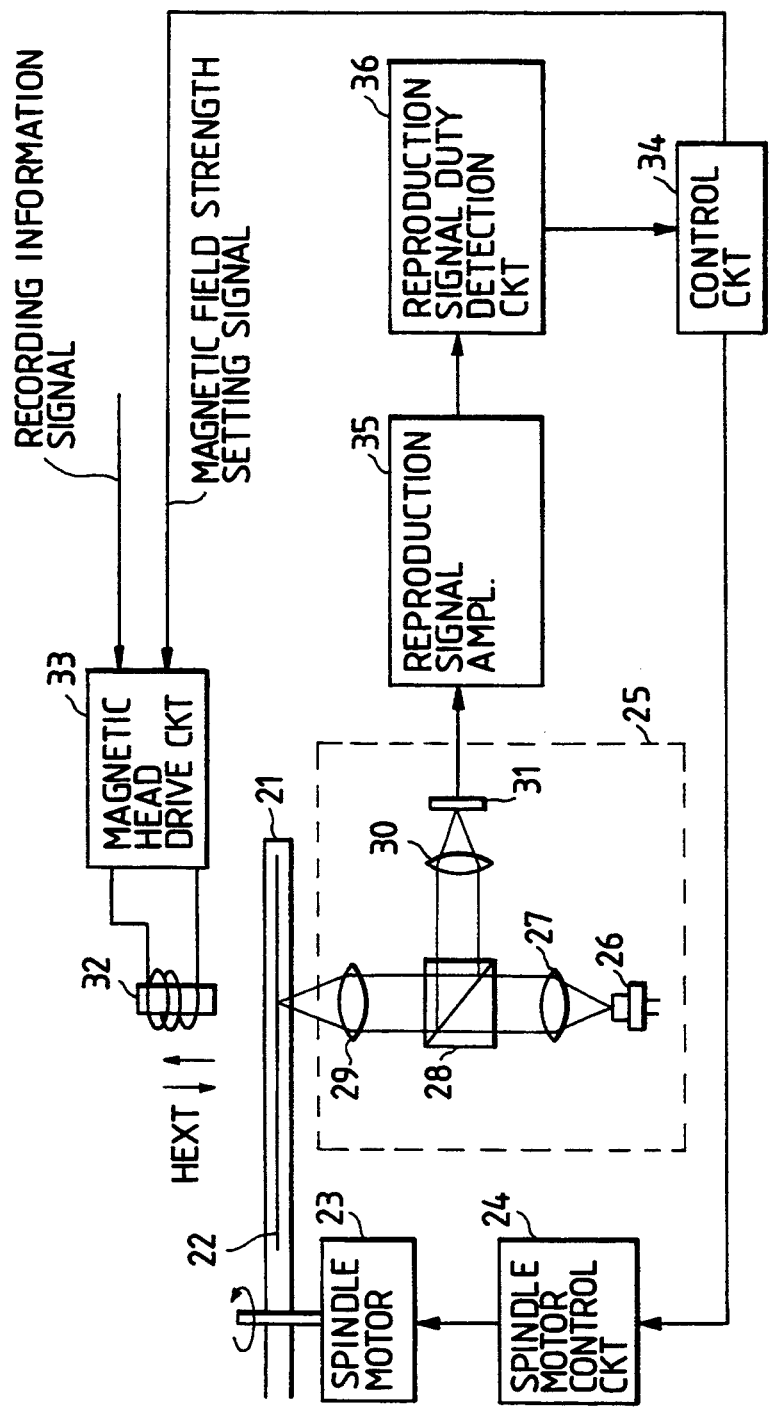
FIG. 4 is a schematic diagram showing an arrangement of a magneto-optic recording apparatus according to the first embodiment of the present invention.

Preferred embodiments of the present invention will be described below with reference to the accompanying drawings. FIG. 4 is a diagram showing a magneto-optic recording apparatus according to an embodiment of the present invention. Referring to FIG. 4, a magneto-optic disk 21 has a thin-film magneto-optic recording layer 22 as a magnetic layer formed on a transparent substrate. The center of the magneto-optic disk 21 is supported on the rotating shaft of a spindle motor 23 and is rotated on the basis of control of a spindle motor control circuit 24. The rotation speed of the spindle motor 23 is controlled by instruction from the control circuit 24. An optical head 25 is arranged below the lower surface of the magneto-optic disk 21 to irradiate the magneto-optic disk 21 with a recording or reproduction light beam and to detect reflected light of the reproduction light beam to reproduce information. The optical head 25 includes a semiconductor laser 26 serving as a recording and reproduction light source, a collimator lens 27 for collimating a divergent laser beam, a polarizing beam splitter 28 for splitting a beam into a beam incident on the magneto-optic disk 21 and a beam reflected by the magneto-optic disk 21, an objective lens 29 for focusing a light beam to form a small beam spot on the recording layer 22, a condenser lens 30 for focusing light reflected by the magneto-optic recording layer 22, and a photosensor 31 for detecting the light focused by the condenser lens 30. A magnetic head 32 is located above the upper surface of the magneto-optic disk 21 to oppose the optical head 25 through the magneto-optic disk 21.

The magnetic head 32 generates a magnetic field modulated with an information signal upon driving a magnetic head drive circuit 33 and applies the modulated magnetic field to the magneto-optic disk 21. The detailed arrangement of the magnetic head drive circuit 33 will be described later. A reproduction signal amplifier 35 amplifies a detection signal from the photosensor 31. A reproduction signal duty detection circuit 36 detects the duty of a reproduction signal on the basis of an output signal from this amplifier 35. A control circuit 34 systematically controls the apparatus as a whole. In this embodiment, the control circuit 34 calculates a shift amount of a magnetic field from the magnetic head 32, which shift is caused by leakage magnetic field components, on the basis of an output signal from the duty detection circuit 36. The control circuit 34 outputs a magnetic field strength setting signal to the magnetic head drive circuit 33 on the basis of this shift amount, thereby correcting the shift of the magnetic field. The control circuit 34 controls the magnetic head drive current of the magnetic head drive circuit 33 to correct the shift of the magnetic field applied to the magneto-optic disk 21, which shift is caused by the leakage magnetic field components, thereby preventing recording errors. The correction operation of this magnetic field will be described in detail later.

Figure 1:
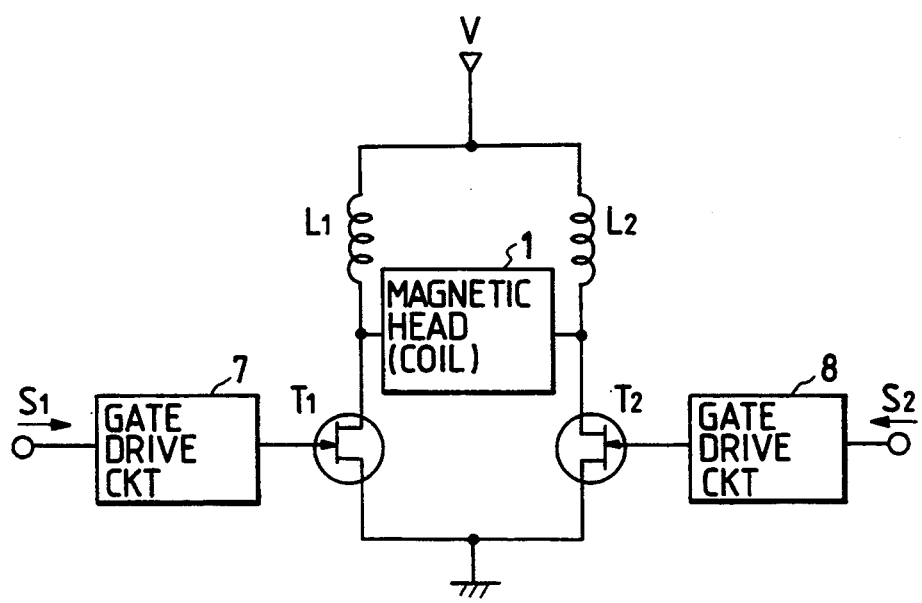
FIG. 1 is a block diagram showing a conventional magnetic head drive circuit.
Figure 5:
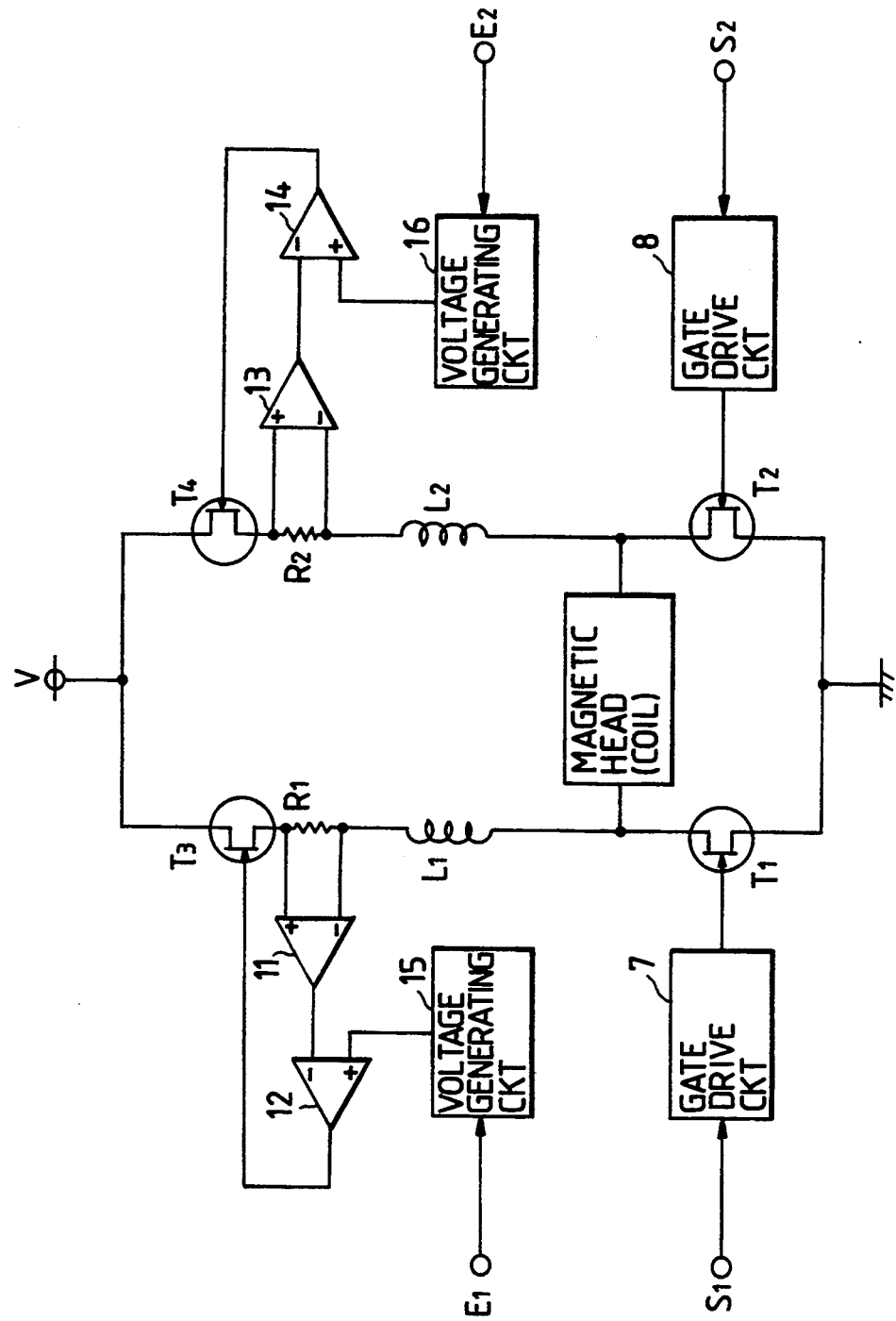
FIG. 5 is a block diagram showing an arrangement of a magnetic head drive circuit shown in FIG. 4.

FIG. 5 is a circuit diagram showing the detailed arrangement of the magnetic head drive circuit 33. The same reference numerals as in the conventional apparatus in FIG. 1 denote the same parts in FIG. 5, and a detailed description thereof will be omitted. Referring to FIG. 5, field effect transistors (to be referred to as transistors hereinafter) $T_3$ and $T_4$ control the amounts of currents flowing in the magnetic head 1. Current detection resistors $R_1$ and $R_2$ are connected in series with the transistors $T_3$ and $T_4$, respectively. Differential amplifiers 11 and 13 detect voltages across the resistors $R_1$ and $R_2$, respectively. Operational amplifiers 12 and 14 compare the detection voltages from the differential amplifiers 11 and 13 with reference voltages from voltage generating circuits 15 and 16 and output control signals corresponding to the differences upon comparison, respectively. Magnetic field strength setting signals from the control circuit 34 (FIG. 4) are output from the control circuit 34 to the voltage generating circuits 15 and 16 to set the reference voltages in the voltage generating circuits 15 and 16. Control signals from the operational amplifiers 12 and 14 are supplied to the gates of the transistors $T_3$ and $T_4$, and the resistances of the transistors $T_3$ and $T_4$ are variably changed in response to these control signals. That is, the reference voltages of the voltage generating circuits 15 and 16 are set in accordance with the magnetic field strength setting signals, and the resistances of the transistors $T_3$ and $T_4$ are variably changed in accordance with these reference voltages to arbitrarily set the current values of the magnetic head 32 in both of the directions. The positive and negative magnetic field strengths of the magnetic field components generated by the magnetic head 32 can be set to desired values.

Figure 6:
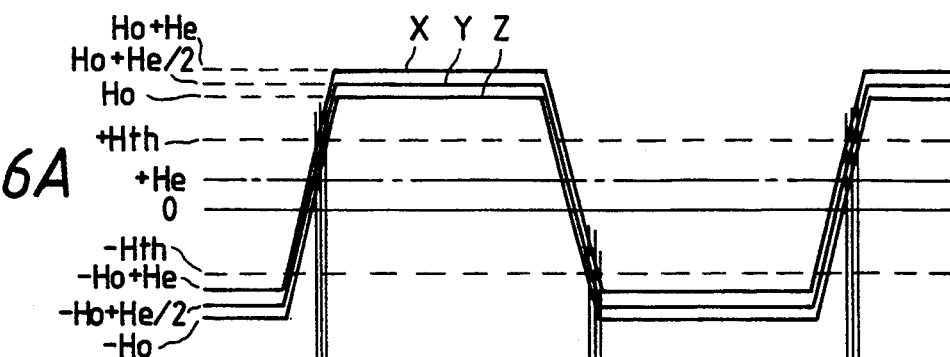
FIGS. 6A to 6G are charts showing waveforms showing changes in magnetic field strengths in the apparatus of FIG. 4, patterns recorded by magnetic field components, and waveforms of signals reproduced by these patterns.

An operation of this embodiment will be described with reference to FIGS. 6A to 6G. A magnetic field Z in FIG. 6A is an original magnetic field ($\pm H_0$) generated by the magnetic head 32 upon driving the magnetic head drive circuit 33. Assume that a leakage magnetic field $+H_e$ as that of a linear motor is present. In a magnetic field X applied to the magneto-optic disk 21, a positive magnetic field component is given as $+H_0+H_e$, and a negative magnetic field component is given as $-H_0+H_e$. The magnetic field is shifted to the positive side by an amount corresponding to the leakage magnetic field $H_e$. When the shifted magnetic field is applied to the magneto-optic disk 21 while a light beam having a predetermined strength is being emitted from the optical head 25 to be incident on the magneto-optic disk 21, the length of upward magnetization is larger than that of downward magnetization, as shown in FIG. 6B. A reproduction signal obtained by reproducing the upward magnetization and the downward magnetization is given such that a pulse width $T_{+2}$ of the reproduction signal component corresponding to the upward magnetization is larger than that $T_{-2}$ of the reproduction signal component corresponding to the downward magnetization, accordingly, as shown in FIG. 6C.

In this embodiment, the positive and negative magnetic field components generated by the magnetic head 32 are adjusted in accordance with the shift amount so as to set the length of the upward magnetization to be equal to that of the downward magnetization, thereby correcting the shift of the magnetic field which is caused by the leakage magnetic field. If the minimum unit of the magnetic field generated by the magnetic head 32 which can be changed by the control circuit 34 is defined as $H_3/2$, the control circuit 34 supplies magnetic field strength setting signals $E_1$ and $E_2$ to the voltage generating circuits 15 and 16 so that the positive and negative magnetic components become $H_0-H_e/2$ and $-H_0-H_e/2$, respectively. As a result, the magnetic head 32 generates a magnetic field Y shown in FIG. 6A, and a magnetization pattern shown in FIG. 6D is recorded on the magneto-optic disk 21. When this pattern is reproduced, the pulse width of the reproduction signal component corresponding to the upward magnetization is $T_{+3}$, and the pulse width of the reproduction signal component of the downward magnetization is $T_{-3}$. The length of the upward magnetization is almost equal to that of the downward magnetization. In this stage, the magnetic field from the magnetic head is not perfectly corrected because only one correction operation is performed. The principle of the correction operation has been described above. The magnetic field correction operation will be supplementarily described below.

Figure 7:
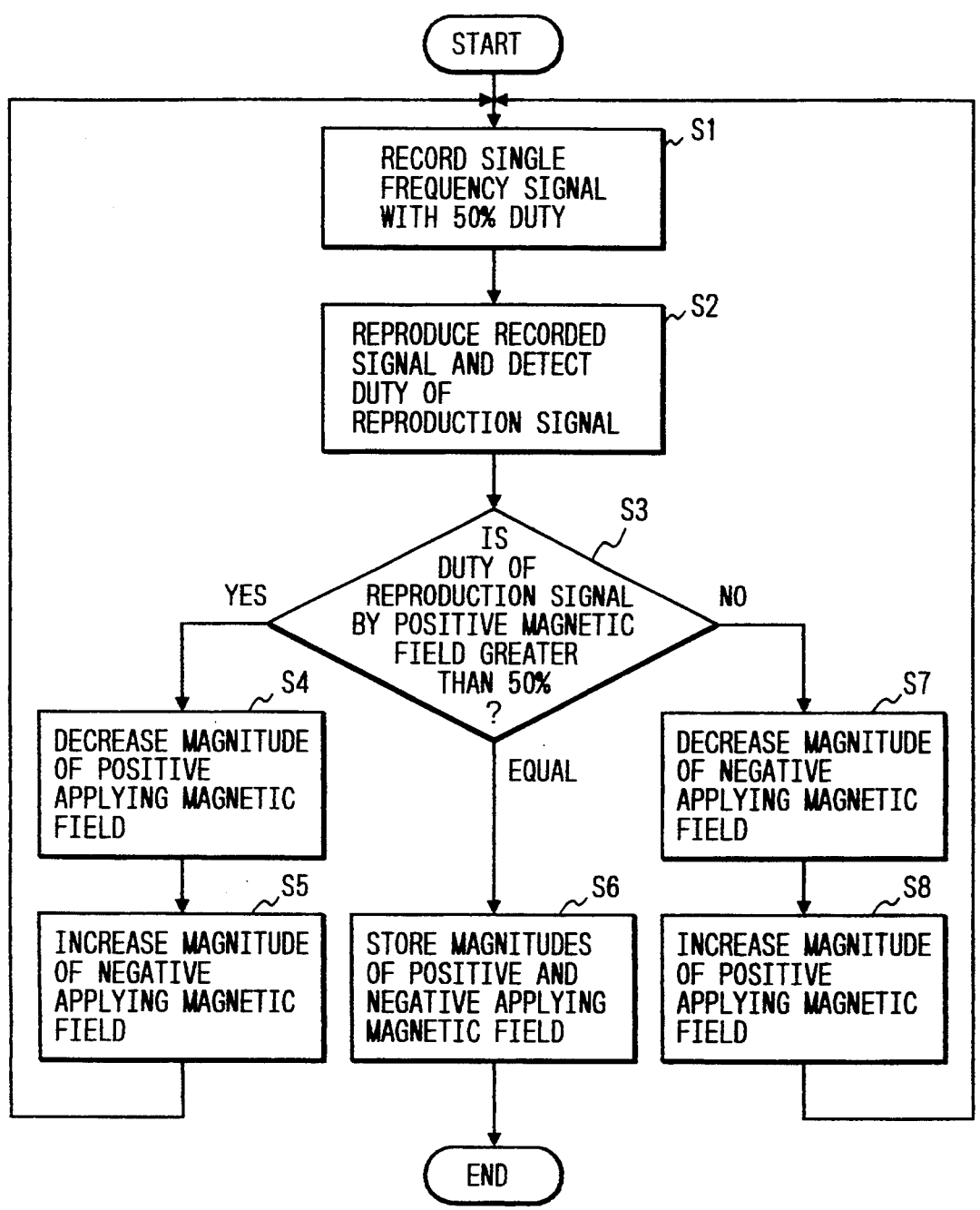
FIG. 7 is a flow chart for explaining a sequence for determining a magnetic field strength in the apparatus of FIG. 4.

FIG. 7 is a flow chart showing the overall operation of magnetic field correction of this embodiment. Referring to FIG. 7, when the power switch of the apparatus is turned on, the control circuit 34 controls the respective components to record a reference signal in a predetermined area on the magneto-optic disk 21 (S1). In this case, a single frequency signal with a 50% duty is recorded as the reference signal. At the end of this recording, the control circuit 34 controls the respective components to reproduce the recorded reference signal. This reproduction signal is sent to the duty detection circuit 36, so that the duty of the reproduction signal is detected (S2). The duty detection circuit 36 generates a signal proportional to a difference between a positive pulse width $T_+$ and a negative pulse width $T_-$ of the reproduction signal (to be described later). The generated signal is supplied as a duty detection signal to the control circuit 34. The control circuit 34 determines in step S3 whether the duty of this signal is higher than the 50% duty of the reproduction signal. If YES in step S3, the control circuit 34 supplies the magnetic field strength setting signal $E_1$ to the voltage generating circuit 15 in the magnetic head drive circuit 33 so as to reduce the positive applying magnetic field (S4). Since the minimum unit for variably changing the magnetic field is defined as $H_3/2$, the magnetic field strength setting signal $E_1$ is output so as to reduce the current amount by the corresponding amount. The operational amplifier 12 compares a detection current from the resistor $R_1$ with the input setting signal to control the transistor $T_3$, thereby reducing the current supplied to the magnetic head 32 by an amount corresponding to $H_e/2$. The control circuit 34 outputs the magnetic field setting signal $E_2$ to the voltage generating circuit 16 so as to increase the negative applying magnetic field by $H_e/2$ (S5). The flow returns to step S1, and steps S1 to S5 are repeated to correct a drive current input to the magnetic head 32 so as to obtain a reproduction signal having a 50% duty. That is, the currents corresponding to the positive and negative magnetic field components of the magnetic head 32 are increased or decreased every unit amount stepwise to correct the shift amount corresponding to the leakage magnetic field. Therefore, the magnetic field applied to the magneto-optic disk 21 is corrected to a magnetic field free from the shift.

In step S3, the duty of the reproduction signal becomes 50%. The control circuit 34 stores the magnitudes of the positive and negative magnetic field components applied to the magneto-optic disk 21 (i.e., the magnitudes of the magnetic field strength setting signals $E_1$ and $E_2$), thereby ending the processing (S6). If the duty of the reproduction signal is determined in step S3 to be lower than 50%, the leakage magnetic field is a negative component. The control circuit 34 outputs the setting signal $E_2$ to the voltage generating circuit 16 so as to reduce the negative current in a manner opposite to that described above (S7), and the control circuit 34 outputs the setting signal $E_1$ to the voltage generating circuit 15 so as to increase the positive current (S8). The same operations as described above are then performed. When the duty of the reproduction signal reaches 50%, the corresponding magnetic field strength setting signals $E_1$ and $E_2$ are stored in a memory, and the processing is ended (S6).

As described above, the magnetic field ($\pm H_0$) corrected and free from either the positive or negative shift amount can be applied as the magnetic field Z shown in FIG. 6A. More specifically, correction is performed as if a magnetic field $-H_e$ having the same magnitude as and a polarity opposite to those of the leakage magnetic field $+H_e$ is generated to cancel the leakage magnetic field. The magnetic field generated by the magnetic head 32 can be equivalently applied to the magneto-optic disk 21. A magnetization pattern having the length of the upward magnetization which is equal to that of the downward magnetization can be recorded on the magneto-optic recording layer 22 of the magneto-optic disk 21, as shown in FIG. 6F. When the recorded information is reproduced, a positive pulse width $T_{+4}$ becomes equal to a negative pulse width $T_{-4}$, as shown in FIG. 6G. Therefore, a signal having a 50% duty has been accurately recorded. In a normal operation, the magnetic head drive circuit 33 is controlled on the basis of the 50% duty value stored in the memory in the control circuit 34. The drive currents to the magnetic head 32, i.e., the current values of both the directions which respectively correspond to the positive and negative magnetic field components, can be controlled to the corrected current values. Even if an ambient leakage magnetic field is present in information recording, the magnetic field applied to the magneto-optic disk becomes an original magnetic field free from the leakage magnetic field. Therefore, the information can be accurately recorded, and at the same time, a recording error caused by a magnetic field shift can be prevented.

FIG. 8 is a circuit diagram showing an arrangement of the reproduction signal duty detection circuit 36. In this arrangement, the reproduction signal duty detection circuit 36 comprises an integrator consisting of a resistor R and a capacitor C. A time constant $\tau$ ($=C \cdot R$) of the resistor R and the capacitor C is set to be about 10 times the period of a recording frequency. When a reproduction signal is input from the reproduction signal amplifier 35 (FIG. 4) to the duty detection circuit 36, an output from the duty detection circuit 36 has a triangular waveform because the capacitor performs the charge and discharge operations in one period of the reproduction signal, as shown in FIG. 9A. In this case, if the duty of the reproduction signal is 50%, as shown in FIG. 9A, an output voltage $V_{d0}$ from the duty detection circuit 36 becomes zero. If the duty of the reproduction signal is not 50%, the output voltage from the duty detection circuit 36 does not become zero, as shown in FIG. 9B, but becomes a given voltage value $V_{d1}$. This voltage changes in accordance with a ratio of the positive pulse width to the negative pulse width of the reproduction signal. Therefore, the control circuit 34 changes the magnetic field strength setting signals $E_1$ and $E_2$ stepwise so as to nullify the output voltage from the duty detection circuit 36, thereby correcting the magnetic field of the magnetic head.

FIG. 10 is a graph showing a relationship between a modulated magnetic field strength applied to the magneto-optic magnetic layer and a carrier to noise level ratio of the reproduction signal of the recorded magnetization pattern. In the above embodiment, the magnetic field generated by the magnetic head is set to have a value sufficiently larger than that of the magnetic field $H_{th}$ required for recording, i.e., a value corresponding to $H_a$ in FIG. 10. When a difference between $H_a$ and $H_{th}$ 18 considerably large, or a leakage magnetic field is small, a long magnetic field adjustment time is required to change the drive currents to the magnetic head stepwise. In the magnetic field correction mode, the level of the magnetic field from the magnetic head is lowered to a level $H_b$ closer to $H_{th}$ in the first step, as shown in FIG. 10. In the second step, when correction shown in FIG. 7 is performed, the magnetic field can be corrected within a short period of time.

An analog circuit such as an integrator need not be used in the reproduction signal duty detection circuit. For example, a digital counter may be used to count the positive and negative pulse widths of the reproduction signal, and a ratio thereof may be calculated. In addition, the correction operation of the magnetic field from the magnetic head may be performed at the power ON time or every time a magneto-optic disk is mounted in the apparatus. The reference signal may be recorded at one or a plurality of positions in the recording area. When the reference signal is recorded at the plurality of positions, magnetic field strength setting signals to be supplied to the magnetic head drive circuits are calculated at each position and stored in the memory. The magnetic head is driven in accordance with a setting signal representing a position closer to the access position of the optical head, and the magnetic field from the magnetic head can be corrected at the position of the magneto-optic disk in accordance with the different magnitudes of leakage magnetic fields. Therefore, high-precision magnetic field correction corresponding to a leakage magnetic field on the magneto-optic disk can be performed.

In the above embodiment, a so-called recording test for recording a reference signal on a recording medium and reading out the recorded reference signal from the recording medium to detect its duty is performed to control the drive currents input to the magnetic head in accordance with the test results. However, the duty of the drive signal input to the magnetic head may be controlled on the basis of the detected duty of the reference signal. This embodiment will be described below. This embodiment has the same arrangement as that in FIG. 4.

In this embodiment, a (1,7) code is used as a modulation code. In the (1,7) code, the recording patterns on the magneto-optic disk upon modulation by a modulator have seven kinds of lengths, i.e., 2T to 8T. A reference signal is a 50% duty signal obtained by alternately arranging 2T patterns. The recorded reference signal is read from the disk, and the duty of the read reproduction signal is detected. The duty of the recording signal is changed on the basis of the detection result to obtain a drive signal. The magnetic head is driven by this drive signal. A change in duty is to add or subtract an offset of a time width sufficient to correct the leakage magnetic field to or from the pulse width of the recording signal. The change in duty corresponds to recording compensation along the time axis.

Figures 2A, 2B, 2C:
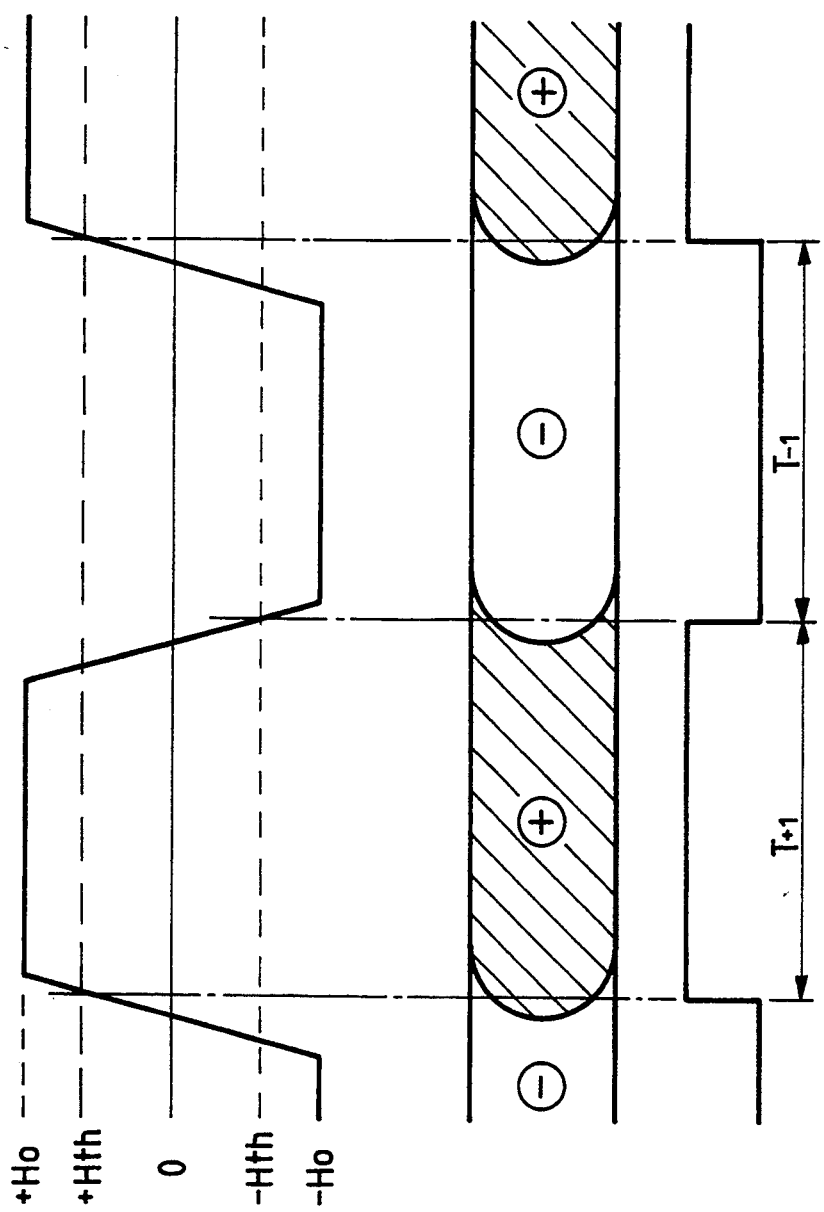
FIGS. 2A to 2C are charts showing a waveform representing changes in magnetic field strengths in the absence of leakage magnetic field components, a pattern recorded by magnetic field components in the absence of the leakage magnetic field components, and a waveform of a signal reproduced from this pattern.
Figures 3A, 3B, 3C:
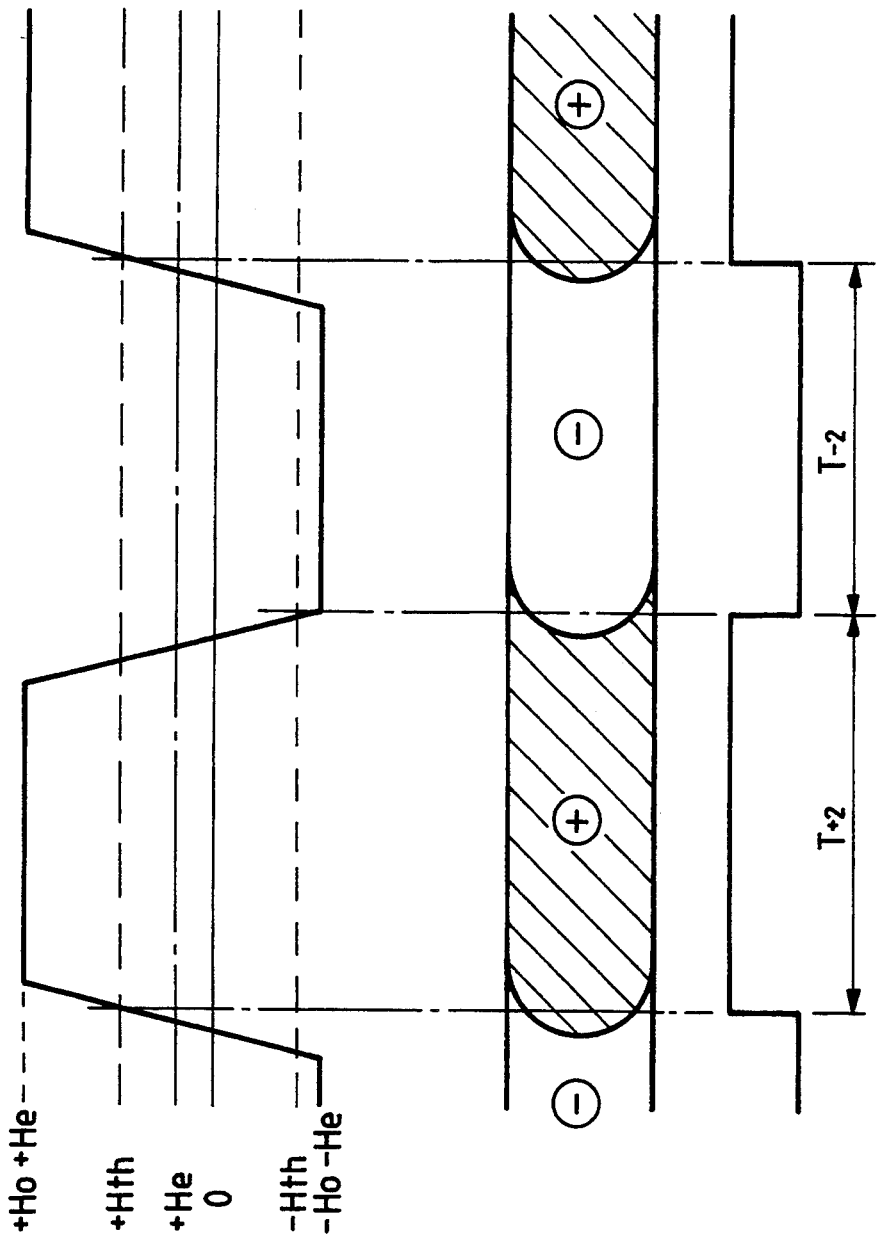
FIGS. 3A to 3C are charts showing a waveform representing changes in magnetic field strengths in the presence of leakage magnetic field components, a pattern recorded by magnetic field components in the presence of the leakage magnetic field components, and a waveform of a signal reproduced from this pattern.

Even in this embodiment, if there is no leakage magnetic field in the apparatus or a self-leakage magnetic field of the disk, the same results as in FIGS. 2A to 2C are obtained. More specifically, a pattern having a positive magnetization pattern (i.e., a hatched portion with a mark $\oplus$ ) having a length equal to that of a negative magnetization pattern (i.e., a portion with a mark $\ominus$ ) is recorded by a 50% duty continuous signal (FIG. 2A), as shown in FIG. 2B. In a reproduction signal obtained by reading the recorded pattern, the positive pulse width $T_{+1}$ is equal to the negative pulse width $T_{-1}$, as shown in FIG. 2C. In this case, $T_{+1}=T_{-1}=2T$.

Figure 11:
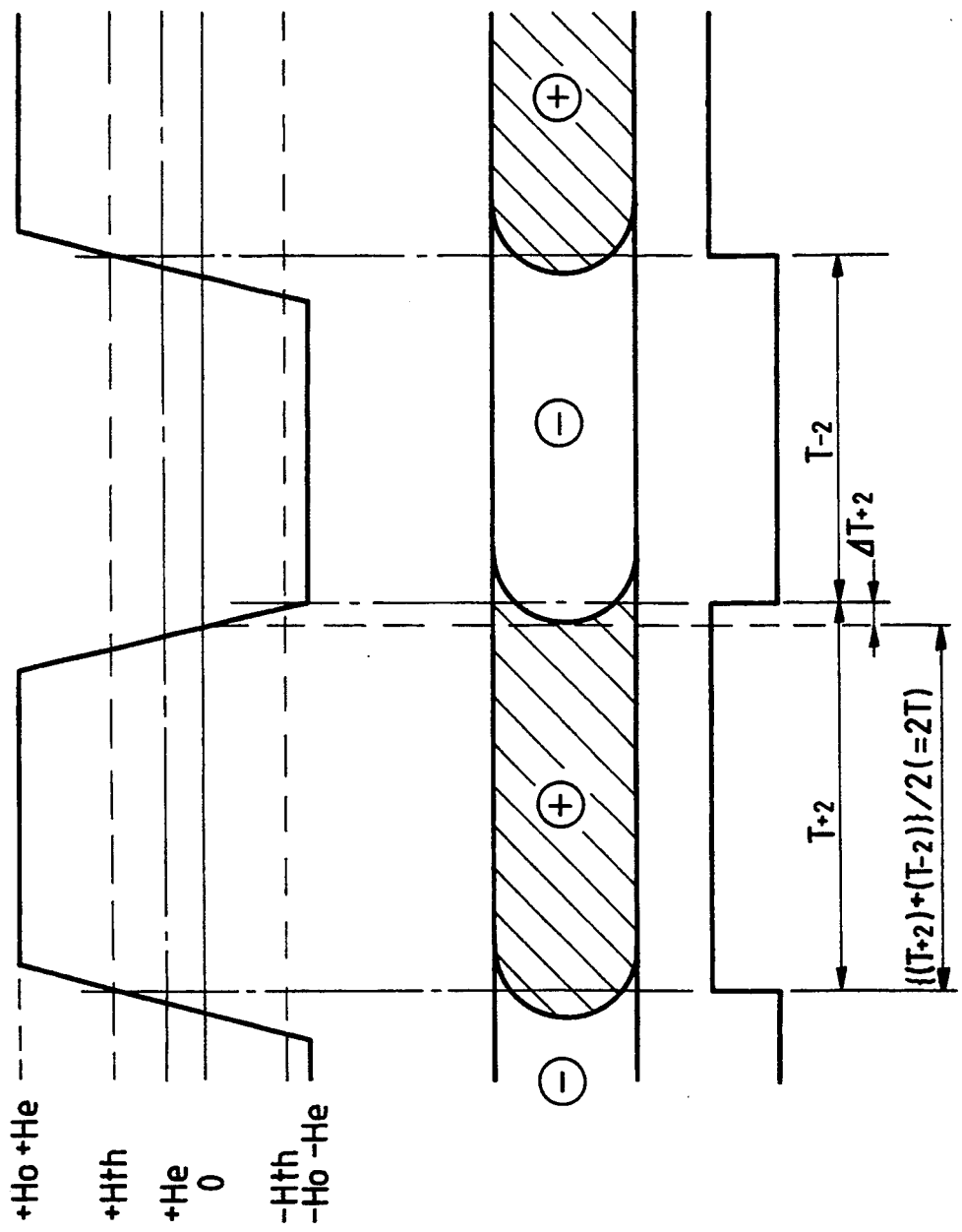
FIGS. 11A to 11C are charts showing a waveform representing a change in magnetic field strength in the presence of leakage magnetic field components, a pattern recorded by magnetic field components in the presence of the leakage magnetic field components, and a waveform of a signal reproduced from this pattern.

To the contrary, if a leakage magnetic field $+H_e$ is present, as shown in FIG. 11A, a pattern shown in FIG. 11B is recorded on the disk, and a reproduction signal obtained from this recorded pattern is shown in FIG. 11C. A positive pulse width $T_{+2}$ is longer than 2T by $\Delta T_{+2}$, and a negative pulse width $T_{+2}$ is shorter than 2T by $\Delta T_{+2}$.

Figure 12:
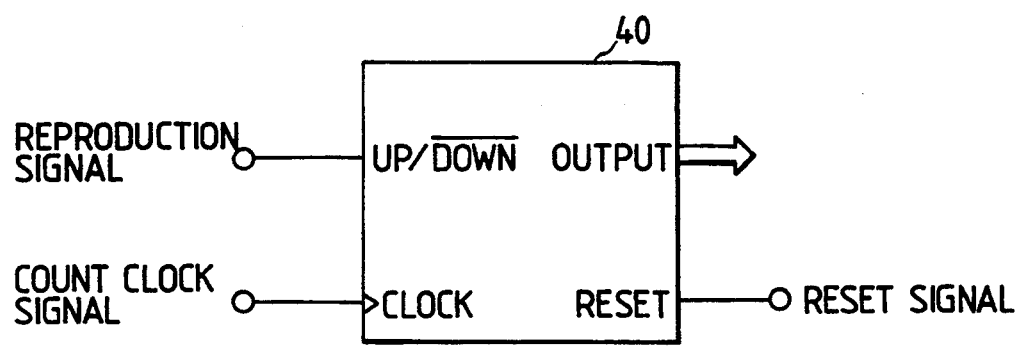
FIG. 12 is a block diagram showing an up/down counter for detecting a change in duty caused by the leakage magnetic field components.

As a method of detecting the above time $\Delta T_{+2}$, for example, a method using an up/down counter shown in FIG. 12 may be assumed. A count clock signal is a signal having a frequency much higher than the maximum frequency of the reproduction signal. For example, the frequency of the count clock signal is preferably set to 10 or more times the maximum frequency of the reproduction signal. The time $\Delta T_{+2}$ is detected in accordance with the following sequence.

A reset signal is input to the reset terminal of an up-/down counter 40 to reset an output value to zero. A reproduction signal is input to the UP/DOWN terminal to count up the output from the up/down counter 40 for a period corresponding to the positive pulse width of the reproduction signal. For example, in FIGS. 11A to 11C, assume that the period of the 2T continuous signal is given as 250 ns (frequency: 5 MHz), that the positive pulse width $T_{+2}$ of the reproduction signal is given as 135 ns, that the negative pulse width $T_{-2}$ is given as 115 ns, and that the period of the count clock signal is given as 2 ns. Under these assumptions, an output from the up/down counter 40 at the end of the positive pulse is 67 (digital value). When the negative pulses of the reproduction signal are input to the counter 40, the output value of the counter 40 is counted down from 67. At the end of the negative pulse, the count becomes 10. From this result, the time $\Delta T_{+2}$ is detected as 20 ns. A method of controlling the duty of the drive signal to the magnetic head on the basis of the $\Delta T_{+2}$ detection result will be described below.

Figures 13A, 13B, 13C:
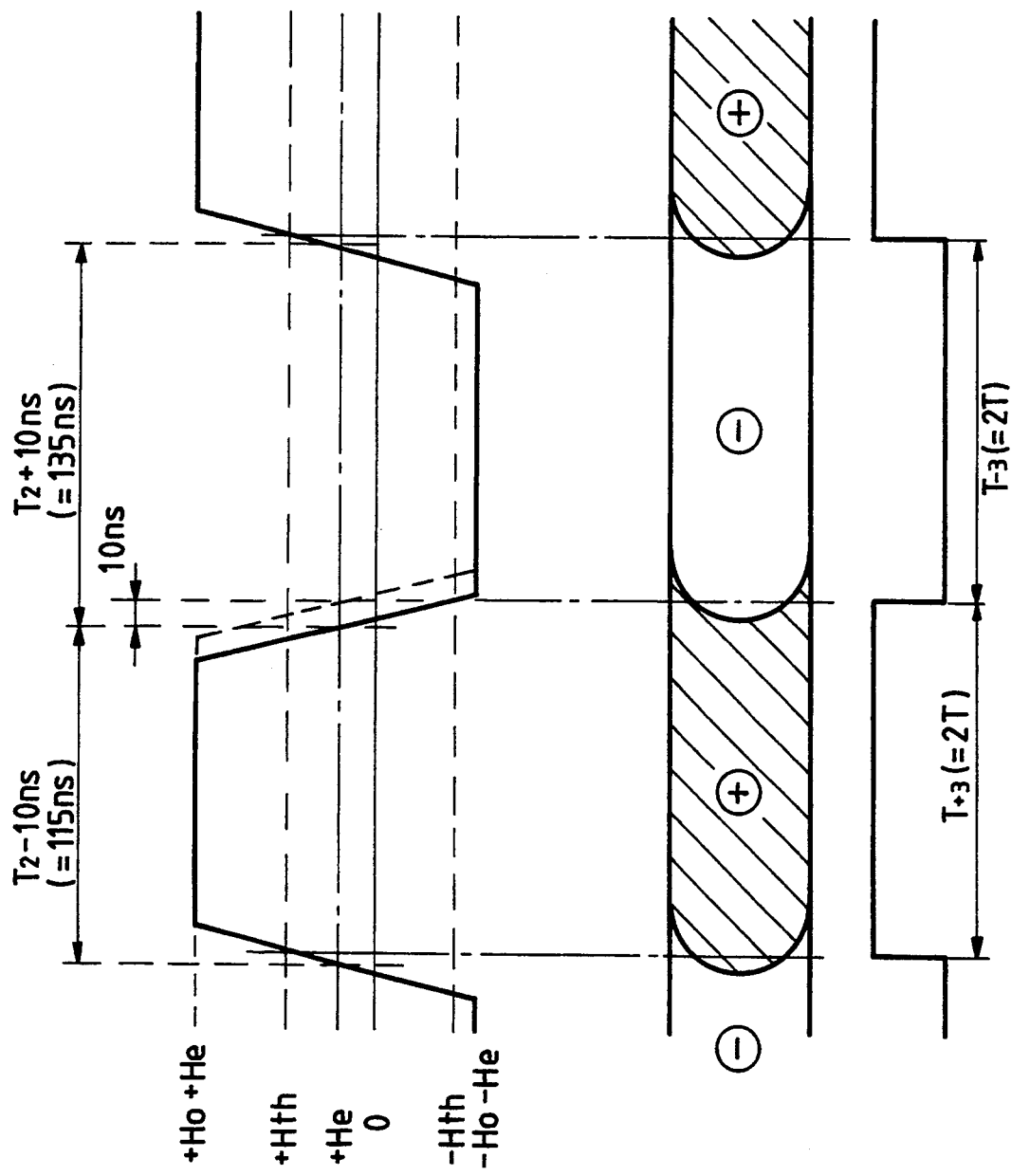
FIGS. 13A to 13C are charts showing a waveform representing a change in magnetic field strength, a pattern recorded by this magnetic field, and a waveform of a signal reproduced from the pattern.

As shown in FIG. 13A, the positive pulse width of the magnetic head drive signal (modulated magnetic field signal) is set shorter than 20 ns by a half (10 ns), and the negative pulse width is set longer than 20 ns by 10 ns on the basis of $\Delta T_{+2}=20$ ns. That is, $$T_2 - 10 \text{ ns} = 115 \text{ ns}$$

$$T_2 + 10 \text{ ns} = 135 \text{ ns}.$$

The magnetic head is driven using the signals whose pulse widths are adjusted, and information is recorded on the disk. In the recorded signal pattern, as shown in FIG. 13B, the length of a positive magnetic pattern (i.e., a hatched portion with a mark $\oplus$ ) is set equal to that of a negative magnetization pattern (i.e., a portion with a mark $\ominus$ ). In a reproduction signal read from the pattern in FIG. 13B, a positive pulse width $T_{+3}$ is set equal to a negative pulse width $T_{-3}$, and the resultant signal is a continuous signal having pulses each having a pulse width 2T, as shown in FIG. 13C.

The correction value of 10 ns detected in the above process is stored beforehand and is used to actually correct a recording signal. A method of correcting a recording signal will be described below.

Figures 14A, 14B, 14C, 14D, 14E:
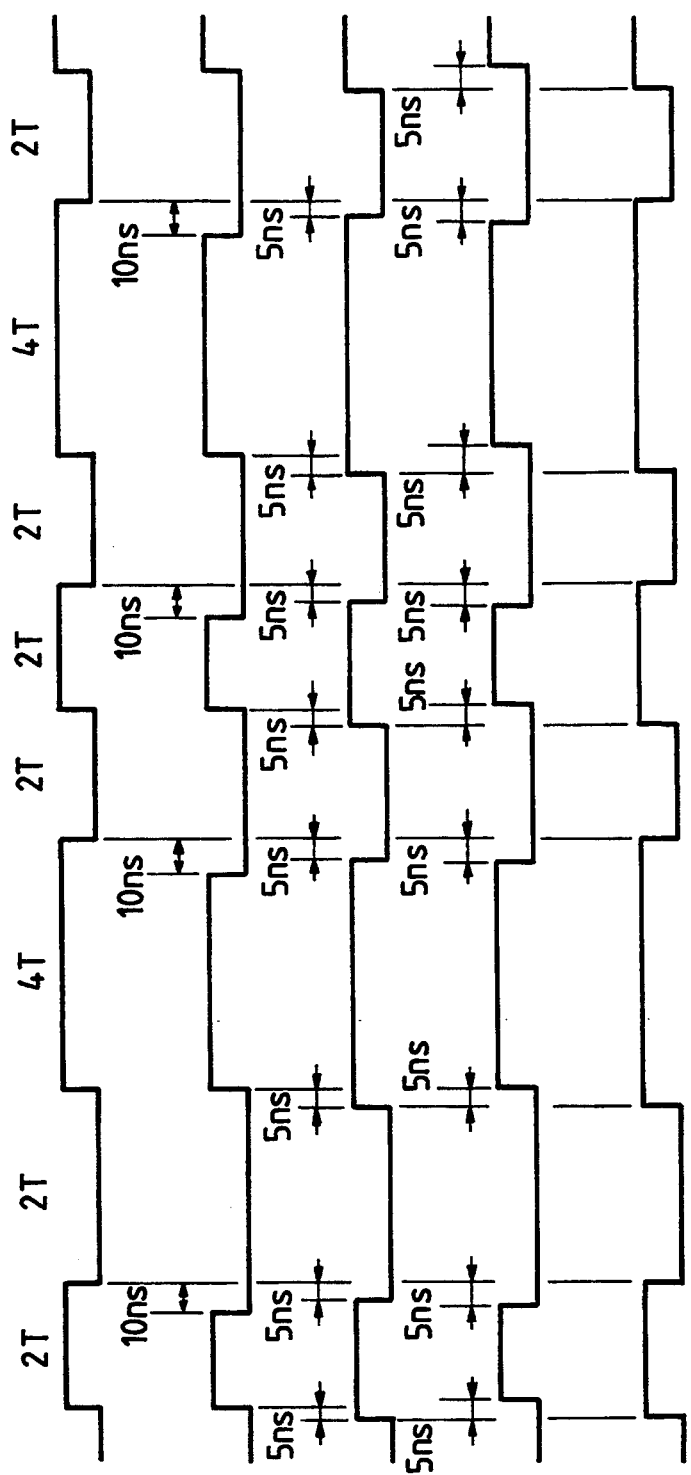
FIGS. 14A to 14E are timing charts for explaining a method of correcting a recording signal in the second embodiment.

Assume that a recording signal having a pattern shown in FIG. 14A is recorded. The trailing edge of a positive pulse of a recording signal in FIG. 14A is advanced by 10 ns (shifted to the preceding side) to obtain a signal shown in FIG. 14B. The positive pulse width of a signal shown in FIG. 14B is shorter than that of the signal shown in FIG. 14A by 10 ns, and the negative pulse width of the signal shown in FIG. 14B is longer than that of the signal shown in FIG. 14A by 10 ns.

A pattern is recorded on the disk using the signal shown in FIG. 14B such that the positive magnetic field pattern is long and the negative magnetic field pattern is short due to the offset of the modulated magnetic field by the leakage magnetic field $+H_e$ in the positive direction. In a reproduction signal read from the recorded pattern, as shown in FIG. 14C, the leading and trailing edges of the positive pulse are delayed by 5 ns, as compared with the signal in FIG. 14A. That is, the reproduction signal in FIG. 14C is similar to the recording signal in FIG. 14A, and the influence of the leakage magnetic field is canceled.

In the above method, the trailing edge of the positive pulse of the recording signal is advanced by 10 ns in the magnetic head drive signal. However, the signal shown in FIG. 14D may be used to drive the magnetic head. The signal in FIG. 14D is obtained such that the leading edge of the positive pulse of the recording signal is delayed by 5 ns, and the trailing edge of the positive pulse is advanced by 5 ns. Even if the magnetic head is driven using the signal shown in FIG. 14D, a reproduction signal read from the disk is equivalent to the recording signal in FIG. 14A, as shown in FIG. 14E. Even if a signal obtained by delaying the leading edge of the positive pulse of the recording signal by 10 ns is used as the magnetic head drive signal, a reproduction signal equivalent to the recording signal can be obtained.

Figure 16:
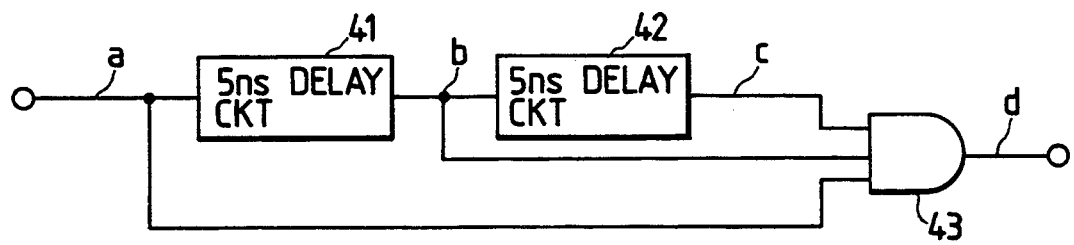
FIG. 16 is a block diagram showing an arrangement of a correction circuit for generating a drive signal for a magnetic head from the recording signal in the second embodiment.

FIGS. 15A to 15D are views for explaining a method of generating a drive signal for the magnetic head from a recording signal. In this case, the leading edge of the positive pulse of the recording signal is delayed by 10 ns. The recording signal is corrected using a correction circuit shown in FIG. 16. Referring to FIG. 16, the correction circuit comprises delay circuits 41 and 42 each for delaying a signal by 5 ns, and an AND gate 43.

Figures 15A, 15B, 15C, 15D:
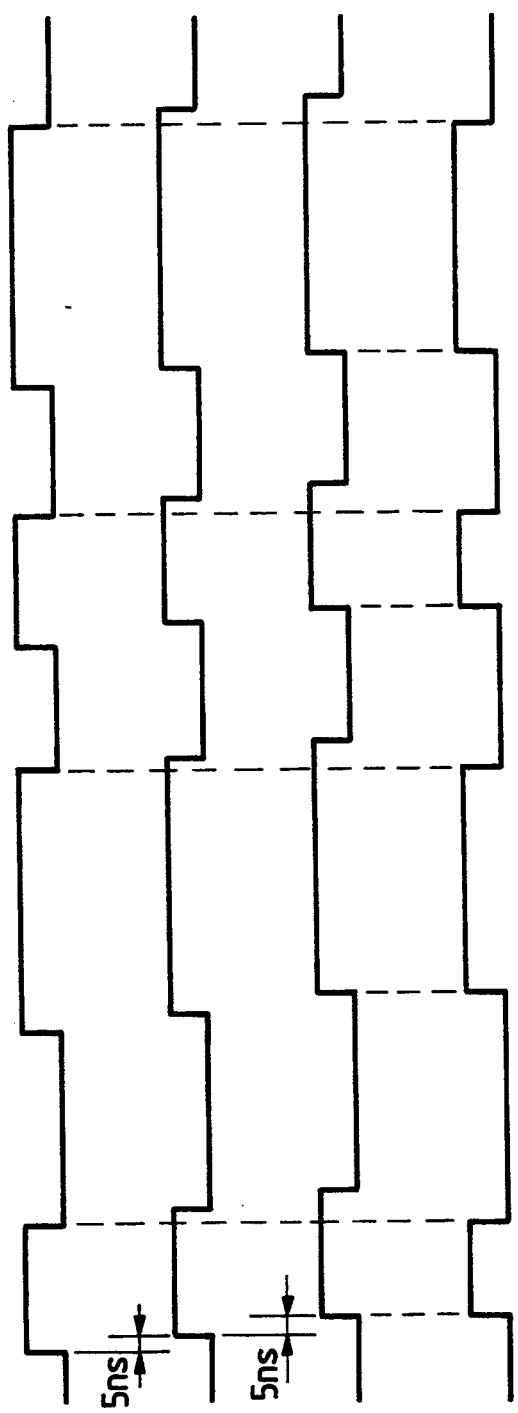
FIGS. 15A to 15D are timing charts for explaining a method of generating a drive signal for a magnetic head from the recording signal in the second embodiment.

A recording signal shown in FIG. 15A is input as a signal a (FIG. 16) to the delay circuit 41 to obtain a 5-ns delayed signal, as shown in FIG. 15B. The signal in FIG. 15B is represented as a signal b in FIG. 16. The signal b is input to the delay circuit 42 to obtain a 5-ns delayed signal, as shown in FIG. 15C. The signal shown in FIG. 15C is represented as a signal c in FIG. 16. The signals a, b, and c are input to the AND gate 43 and logically ANDed to obtain a signal d as a logical sum signal. The signal d is a signal obtained by delaying the leading edge of the positive pulse of the recording signal by 10 ns, as shown in FIG. 15D. The magnetic head is driven by the signal d to perform recording free from the influence of the leakage magnetic field, as described above.

In the above embodiment, the arrangement for controlling a drive current input to the magnetic head, and the arrangement for controlling the duty of the drive signal have been described above. However, these arrangements may be combined to embody the present invention. That is, a reference signal can be recorded on a recording medium, and the recorded reference signal can be read from the recording medium to detect its duty. The drive current input to the magnetic head and the duty of the drive current can be controlled in accordance with the detection result.

In the above embodiment, a recording test may be performed to variously control the timings. For example, the recording test may be performed every time a disk is mounted in the apparatus, or the recording test may often be performed at an interval between recording or reproduction operations. A temperature detecting means may be arranged in the apparatus to perform a recording test when a change in temperature in the apparatus exceeds a predetermined range.

The leakage magnetic fields include a leakage magnetic field from a constituent element such as a linear motor in the apparatus and a magnetic field caused by magnetization of the recording medium itself (called a diamagnetic field, internal magnetic field, or a self-leakage magnetic field). Of these leakage magnetic fields, the influence of the self-leakage magnetic field of the disk is assumed to be constant at any portion of the disk. However, the leakage magnetic field from the constituent component in the apparatus varies depending on the respective portions of the disk. In this case, the recording test is preferably performed a plurality of times at different radial positions of the disk. For example, the recording test is performed at three locations, i.e., the inner peripheral portion of the disk, an intermediate portion of the disk, and an outer peripheral portion of the disk. Correction values obtained in the test results are stored in the memory. In actual information recording, a correction value corresponding to the recording position is read out from the memory, and the drive signal to the magnetic head is controlled on the basis of the readout correction value.

A so-called zone constant angular velocity (ZCAV) method of dividing the disk in a plurality of radial regions and recording information in these regions at different frequencies is known. When the present invention is applied to a magneto-optic recording apparatus of this ZCAV method, a recording test may be performed for each region.

The present invention is not limited to the particular embodiments described above. Various changes and modifications may be made without departing from the scope of the appended claims. All these applications can be incorporated in the present invention.

What is claimed is:

1. A magneto-optic recording apparatus comprising:
   an optical head for irradiating a magneto-optic recording medium with a light beam;
   a magnetic head for applying a modulated magnetic field to the recording medium to record a signal on the recording medium;
   a drive circuit for supplying a drive signal to said magnetic head;
   reference signal generating means for causing said drive circuit to generate a reference signal having a predetermined duty;.
   reproducing means for reproducing the signal recorded on the recording medium;
   a detection circuit for detecting a duty of a reproduced signal; and a control circuit for controlling the drive signal such that the duty of the signal recorded on the basis of the reference signal and detected by said detection circuit becomes close to the predetermined duty.

2. An apparatus according to claim 1, wherein said control circuit causes said magnetic head to record a reference signal on the recording medium and controls a current value of the drive signal in accordance with a duty of the reference signal detected by said detection circuit.

3. An apparatus according to claim 1, wherein said control circuit causes said magnetic head to record a reference signal on the recording medium and controls a duty of the drive signal in accordance with a duty of the reference signal detected by said detection circuit.

4. An apparatus according to claim 1, wherein said reproducing means comprises a photosensor for detecting the light beam reflected by the recording medium.

5. A magneto-optic recording apparatus comprising:
an optical head for irradiating a magneto-optic recording medium with a light beam;
a magnetic head for applying a modulated magnetic field to the recording medium to record a signal on the recording medium;
a drive circuit for supplying a drive signal to said magnetic head;
reproducing means for reproducing the signal recorded on the recording medium;
a detection circuit for detecting a duty of a reproduced signal; and
a control circuit for controlling the drive signal in accordance with the duty detected by said detection circuit,
wherein said control circuit comprises a pair of switching elements for switching a current flowing through said magnetic head between first and second directions opposite to each other, a gate drive circuit for driving said switching elements in accordance with a signal to be recorded, a current detection device for detecting current values flowing in the first and second directions, respectively, a setting circuit for setting first and second reference values in accordance with a duty detected by said detection circuit, a comparison circuit for comparing the current values of the first and second directions which are detected by said current detection device with the first and second reference values set by said setting circuit, and a control element for controlling the current values in the first and second directions to be equal to the first and second reference values, respectively, in accordance with a comparison result from said comparison circuit.

6. An apparatus according to claim 5, wherein said current detection device comprises first and second resistors connected to both terminals of said magnetic head, and first and second differential amplifiers for detecting voltages across said first and second resistors, respectively, and said setting circuit comprises first and second voltage generating circuits for generating first and second reference voltages in accordance with the duty detected by said detection circuit.

7. A magnetic head drive apparatus comprising:
a magnetic head;
a pair of switching elements for switching a current flowing through said magnetic head between first and second directions opposite to each other;
a gate drive circuit for driving said switching elements in accordance with a signal to be recorded;
a current detection device for detecting current values flowing in the first and second directions, respectively;
a setting circuit for setting first and second reference values in accordance with an external command signal;
a comparison circuit for comparing the current values of the first and second directions which are detected by said current detection device with the first and second reference values set by said setting circuit; and
a control element for controlling operation to set the current values in the first and second directions to be equal to the first and second reference values, respectively, in accordance with a comparison result of said comparison circuit.

8. An apparatus according to claim 7, wherein said current detection device comprises first and second resistors connected to both terminals of said magnetic head, and first and second differential amplifiers for detecting voltages across said first and second resistors, respectively, and said setting circuit comprises first and second voltage generating circuits for generating first and second reference voltages in accordance with an external command signal.

9. A method of recording a signal using a magneto-optic recording apparatus comprising an optical head for irradiating a magneto-optic recording medium with a light beam, a magnetic head for applying a modulated magnetic field to said recording medium to record the signal on said recording medium, a drive circuit for supplying a drive signal to said magnetic head, reproducing means for reproducing the signal recorded on said recording medium, and a detection circuit for detecting a duty of a reproduced signal, said method comprising the steps of:
supplying a reference signal having a predetermined duty to said magnetic head to record the reference signal on said recording medium;
reproducing the reference signal recorded on said recording medium by said reproducing means;
detecting the duty of a reproduced reference signal by said detection circuit;
adjusting a current value of the reference signal so that the duty of a detected reference signal is set equal to the duty of the reference signal supplied to said magnetic head; and
supplying to said magnetic head a drive signal modulated in accordance with information to be recorded and having a current value equal to that of an adjusted reference signal, thereby recording the information on said recording medium.

10. A method according to claim 9, wherein the step of adjusting the current value of the reference signal comprises the step of gradually changing a current value of a reference signal supplied to said magnetic head while the duty of the recorded reference signal is compared with the duty of the reference signal supplied to said magnetic head.

11. A method of recording information on a recording medium by applying a modulated magnetic field to the medium, said method comprising the steps of:
supplying a reference signal having a predetermined duty to a magnetic head to record the reference signal on the medium;

reproducing the reference signal recorded on the medium by reproducing means;

detecting the duty of a reproduced reference signal by detection means;

adjusting a current value of the reference signal such that the duty of a detected reference signal is set equal to the duty of the reference signal supplied to the magnetic head; and supplying to the magnetic head a drive signal modulated in accordance with information to be recorded and having a current value equal to that of an adjusted reference signal, thereby recording the information on the medium.

* * * * *

UNITED STATES PATENT AND TRADEMARK OFFICE
CERTIFICATE OF CORRECTION

PATENT NO. : 5,394,380
DATED : February 28, 1995
INVENTOR(S) : Koyo HASEGAWA

It is certified that error appears in the above-indentified patent and that said Letters Patent is hereby corrected as shown below:

ON THE COVER PAGE ITEM [56],

UNDER "FOREIGN PATENT DOCUMENTS":

"3157839 7/1991 Japan" should read --03-157839 7/1991 Japan--.

COLUMN 6:

Line 63, "$H_3/2$," should read --$H_e/2$,--.

COLUMN 9:

Line 10, "$H_{th}18$" should read --$H_{th}$ is.

COLUMN 10:

Line 18, "$T_{+2}$" should read --$T_{-2}$--.

Signed and Sealed this

Twenty-seventh Day of June, 1995

Attest:

BRUCE LEHMAN

Attesting Officer

Commissioner of Patents and Trademarks